(12) United States Patent
Szabo et al.

(10) Patent No.: US 10,733,768 B2
(45) Date of Patent: Aug. 4, 2020

(54) METHOD AND APPARATUS FOR DATA REDUCTION OF FEATURE-BASED ENVIRONMENT INFORMATION OF A DRIVER ASSISTANCE SYSTEM

(71) Applicant: Robert Bosch GmbH, Stuttgart (DE)

(72) Inventors: Vilmos Szabo, Budapest (HU); Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 16/128,595

(22) Filed: Sep. 12, 2018

(65) Prior Publication Data

US 2019/0080482 A1    Mar. 14, 2019

(30) Foreign Application Priority Data

Sep. 14, 2017  (DE) .................. 10 2017 216 267

(51) Int. Cl.
*G06T 9/00* (2006.01)
*G06K 9/62* (2006.01)
*G06K 9/00* (2006.01)
*G06T 7/33* (2017.01)
*G06F 16/29* (2019.01)

(52) U.S. Cl.
CPC .............. *G06T 9/005* (2013.01); *G06F 16/29* (2019.01); *G06K 9/00791* (2013.01); *G06K 9/6212* (2013.01); *G06K 9/6262* (2013.01); *G06T 7/337* (2017.01); *G06T 2207/30252* (2013.01)

(58) Field of Classification Search
CPC .... B64D 47/08; B64C 39/024; G05D 1/0676; H64C 39/024; G06T 7/00; G06T 7/0018; G06T 7/002

USPC ...... 348/208.2; 382/232, 103, 141, 291, 152
See application file for complete search history.

(56) References Cited

U.S. PATENT DOCUMENTS

2014/0368651 A1* 12/2014 Irschara .................. G06T 7/00
                                                              348/148
2019/0220039 A1*  7/2019 Wu ...................... B64C 39/024

FOREIGN PATENT DOCUMENTS

DE        102015203016 A1     8/2016

OTHER PUBLICATIONS

Chandrasekhar, et al.: "Compressed Histogram of Gradients: A Low-Bitrate Descriptor," International Journal of Computer Vision 96(3), (2012), pp. 384-399.

(Continued)

*Primary Examiner* — Phuoc H Doan
(74) *Attorney, Agent, or Firm* — Norton Rose Fulbright US LLP; Gerard Messina

(57) ABSTRACT

A method in a training phase includes acquiring a first image of an environment of a means of locomotion from a first position, using an optical sensor; acquiring a second image of the environment of the means of locomotion from a second position, differing from the first position, using the optical sensor; ascertaining features that represent the first image and ascertaining features that represent the second image using an algorithm for feature extraction; selecting those features of the first and the second image which do not meet a predefined rating criterion; and ascertaining significant similarities between the selected features of the first and the second image and storing references that represent the significant similarities. A method is performed in an execution phase that makes use of the stored features of the training phase.

10 Claims, 2 Drawing Sheets

(56) References Cited

OTHER PUBLICATIONS

Ji, Rongrong, et al.: "Location Discriminative Vocabulary Coding for Mobile Landmark Search," Int. J. Comput. Vis. 96 (2012), pp. 290-314.
Makar, et al., "Compression of image patches for local feature extraction," 2009 IEEE International Conference on Acoustics, Speech and Signal Processing, IEEE, (2009), pp. 821-824.

* cited by examiner

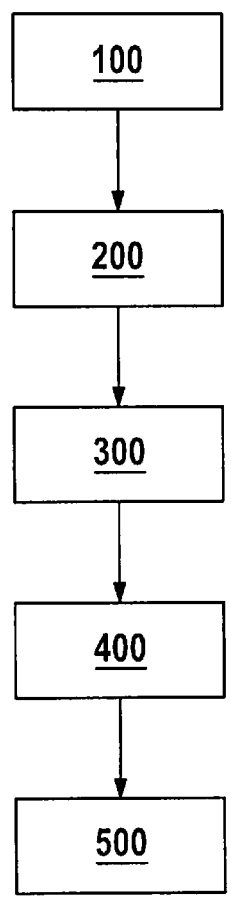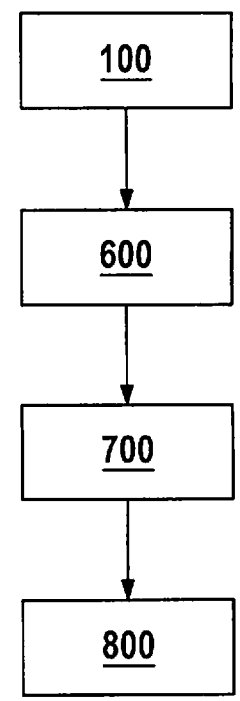
FIG. 1
FIG. 2

METHOD AND APPARATUS FOR DATA REDUCTION OF FEATURE-BASED ENVIRONMENT INFORMATION OF A DRIVER ASSISTANCE SYSTEM

CROSS-REFERENCE TO RELATED APPLICATIONS

The present application claims priority under 35 U.S.C. § 119 to DE 10 2017 216 267.8, filed in the Federal Republic of Germany on Sep. 14, 2017, the content of which is hereby incorporated by reference herein in its entirety.

FIELD OF THE INVENTION

The present invention relates to methods and an apparatus for data reduction of feature-based environment information of a driver assistance system, the methods including a first method for a training phase and a second method for an execution phase of the driver assistance system.

BACKGROUND

Detection of the environment of means of locomotion using sensors, and automatic intervention in the control system of the means of locomotion based on the sensor information, are very important in the existing art. It is thereby possible to implement driver assistance systems that, for example, can enhance safety or driving comfort. One such driver assistance system is, for example, the "Home Zone" parking assist system of Robert Bosch GmbH, which can automatically execute a recurrent parking operation based on fixed starting and destination positions. A first prerequisite for this is execution of a manual training run in which the parking assist system detects the necessary environmental information along a movement path (or "trajectory") of the means of locomotion, evaluates it, and stores it for a subsequent automatic parking operation along that movement path.

In particular, in conjunction with sensor-based driver assistance systems, large data volumes that represent environmental information can occasionally occur when detecting the environmental information. Because driver assistance systems as a rule are implemented in the form of embedded systems, only limited technical resources (memory, computing power, etc.) are often available, since the individual component costs usually need to be kept low due to large production volumes. The available nonvolatile memory, such as a flash memory or EPROM memory, of such an embedded system is therefore in particular often of very small dimensions. In order nevertheless to allow the potentially large data volumes of a sensor-based driver assistance system to be permanently stored, additional measures are therefore necessary so that all the necessary data can be stored in the available memory. Methods for data reduction (lossy) and data compression (lossless) are often used for this purpose. The methods known in the existing art for data reduction and data compression permit a greater or lesser degree of decrease in the original data volume depending on the nature of the data to be detected and stored. In particular when known data reduction methods for image information or moving-image information are used, a data reduction carried out in this manner cannot be sufficient to allow the remaining data to be stored completely in a predefined nonvolatile memory. The reason is that these data reduction methods are directed toward retaining as much of the image information (image resolution, image content, etc.) as possible.

When these image processing methods are used in an embedded system, the result can be either that the image information must be further reduced in an additional processing step (which is generally possible only by additionally discarding possibly relevant image information) or that the nonvolatile memory that is underdimensioned for the specific application must be replaced by a larger memory adapted to the data volume, which would entail higher costs.

In addition to the objective of decreasing the data volume for reasons of memory capacity, a reduced data volume can also be advantageous in terms of data transfer, since a smaller data volume as a rule requires a lower data transfer rate. This can be significant, for example, in the context of data interchange between a processor and an internal or external memory, since cost savings can be achieved here as well thanks to the use of lower-performance (embedded) systems.

An object of the present invention is therefore to optimize the data-reduction and data-compression methods known in the existing art in terms of the storage of feature-based environmental information.

SUMMARY

According to an example embodiment of the present invention, the object recited above is achieved by a method for data reduction of feature-based environmental information of a driver assistance system of a means of locomotion. The method provides for acquisition of a first image of an environment of a means of locomotion from a first position, using an optical sensor of the means of locomotion. The optical sensor can be, for example, a camera of the driver assistance system which is located at a suitable point on the means of locomotion so that the requisite environmental information can be optimally detected. In a subsequent method step the method provides for acquisition of a second image of the environment of the means of locomotion from a second position that is not identical to the first position. Using the example of a parking assist system, this can be achieved by the fact that the means of locomotion is first maneuvered into a starting position to be defined by a user. In the context of the Home Zone parking assist system described above, the starting position is preferably a region in the immediate vicinity (e.g., 10 to 100 meters) of a parking opportunity. This can be, for example, the beginning of an entrance into a garage on a property on the other side of a street on which a user slows the means of locomotion or brings it to a halt in order to "teach" it for an automatic parking operation. The user can then shift the parking assist system into a training mode by way of a corresponding user action. The user can then execute the desired parking operation once or several times for training purposes, while the parking assist system detects that operation using a camera. Acquisition of the first and the second image of the environment of the means of locomotion can be carried out, for example, after different predefined route segments of the means of locomotion, which have been respectively defined for the first and the second image, have been traveled.

In a subsequent method step, features that suitably represent the images or the environmental information contained therein are extracted from the acquired images. The feature data can be ascertained, for example, by an evaluation unit that is a constituent of the driver assistance system. Conversion of the original image information into a feature space defined by the features represents the basis for the subsequent method steps. One of the advantages of extracting and processing feature data is that application-specific information can be recovered in targeted fashion from any data sources, with the result that on the one hand filtering of the relevant information necessary for the respective application takes place, and on the other hand improved comparability of that information is achieved.

The extracted features, for example information regarding brightness or contrast or the color information of individual image points or also of entire image regions, are preferably combined in the form of feature vectors. Examples of the creation of suitable features and/or feature vectors are discussed, for example, in the following publications: Chandrasekhar, Vijay, et al., "Compressed histogram of gradients: A low-bitrate descriptor," International Journal of Computer Vision 96.3 (2012), 384-399; Makar, Mina, et al., "Compression of image patches for local feature extraction," 2009 IEEE International Conference on Acoustics, Speech and Signal Processing. IEEE, 2009; and Ji, Rongrong, et al., "Location discriminative vocabulary coding for mobile landmark search," International Journal of Computer Vision 96.3 (2012), 290-314.

The extracted feature vectors are preferably combined in the form of a feature matrix or "feature map." According to the present invention, the dimension of the feature matrix is based on the dimension of the original images. This means that an image made up of M×N image elements is converted into a feature matrix that contains M×N feature vectors. The dimension of the feature matrix is not, however, obligatorily coupled to the dimension of the image.

According to the present invention, in a subsequent method step the feature matrix is subjected to a filtering operation so that any information of the feature matrix which is not required can be discarded in the interest of data reduction. For that purpose, individual elements and/or regions of the feature matrix can be rated using a predefined rating criterion. Elements that do not meet the rating criterion are marked in the feature matrix as invalid. One preferred rating criterion is represented by the contrast information of image points or image regions. High-contrast regions as a rule contain information that is important for the method according to the present invention, and low-contrast regions can be discarded. Whether a contrast is rated as high or low can be made dependent on the noise of the image sensor. A contrast can be rated as too low if it could also be brought about by the noise of the image sensor. No particularly reliable information can be obtained from image regions having correspondingly low contrast at the level of the image sensor noise, and such image regions or feature matrix elements can therefore be marked as invalid. The contrast information can be taken, for example, directly from the feature matrix if it has been extracted as an independent feature in the course of feature extraction. Alternatively or additionally, the contrast information can also be ascertained from the original image information. In the instance in which the dimension of the image and that of its pertinent feature matrix are identical, the contrast information ascertained from the image can be transferred directly to the elements of the feature matrix, so that the corresponding elements or regions of the feature matrix can be marked as invalid if they do not meet the rating criterion.

In a subsequent method step, the filtered feature matrix of the first image is compared with the filtered feature matrix of the second image. The objective is to identify and select, on the basis of the extracted features, the greatest possible similarities between the features of the images acquired at the different positions. Those similarities as a rule represent important objects in the environment of the means of locomotion, on the basis of which the parking assist system can orient itself, after a successfully completed training phase, in the course of an automatic parking operation. Features or feature vectors that are not contained in similar form both in the feature matrix of the first image and in the feature matrix of the second image are tagged as invalid in a resulting feature matrix for the two images. Similarity dimensions or distance dimensions known from the existing art can be used in order to determine similarities between features and/or feature vectors.

When dissimilar, or only weakly similar, features in the resulting feature matrix are tagged as invalid or removed, the result as a rule is to generate matrix referred to as "sparse," since it is only partly populated with feature information, while large parts of the matrix are marked as invalid and no longer contain any feature information. The volume of data that represent the resulting feature matrix is thereby further reduced. Depending on the organization of the resulting feature matrix in the memory, a physical reduction in the memory space requirement can already be achieved by the fact that, for example, only the relevant feature information is combined in the form of a concatenated list. The irrelevant feature information is therefore no longer a constituent of the resulting feature matrix (not even in the form of data marked as invalid), and therefore no longer occupies memory space. Alternatively or in addition to organization of the feature data as a concatenated list, however, the above-described method steps can also serve as preparation for a compression operation to be carried out subsequently, which then brings about the actual physical reduction of the memory space requirement.

The internal memory usually has small dimensions, but it offers the advantage of having fast connections; in other words, write and read processes to and from the internal memory can occur very quickly. The nonvolatile memory (whose dimensions can be small or large) is not rapidly accessible in this manner. The interim results of the computation operations of the evaluation unit with respect to the above-described method steps are therefore preferably stored in a volatile internal memory. It is only at the end of the training phase that the maximally reduced feature data are written into the nonvolatile memory.

The method according to the present invention is not restricted to the acquisition and processing of a first and a second image. In conjunction with the training phase of a parking assist system, advantageously a plurality of images are acquired during the training phase and subjected to the above-described method steps.

In a further preferred example embodiment, the data of the features selected using the method according to the present invention are further reduced by the application of known compression methods. Run-length encoding, which in particular can compress the data of the sparse feature matrix particularly efficiently, can be used, for example, for this purpose. This is possible because those elements of the matrix which are not populated by feature information (and which are occupied, for example, by the value "0"), often occupy contiguous regions of the matrix, so that repeated occurrence of the value "0" is represented by run-length encoding in abbreviated form by indicating the value and the frequency with which the value occurs. For example, if successive entries of unpopulated elements are present in the feature matrix, for example "000000," that sequence is represented by run-length encoding in compressed form as "6×0," which here means "six times zero."

Alternatively or in addition to run-length encoding, an entropy coding procedure, such as Huffman coding known from the existing art, can also be utilized. The latter procedure achieves data compression by the fact that frequently occurring characters are represented by shorter code words, and infrequently occurring characters by longer code words. This can result in efficient data compression especially in the context of compression of those feature vectors of the feature matrix which are marked as invalid.

In a further preferred example embodiment of the method according to the present invention, acquisition of the first and the second image using the optical sensor is carried out upon reaching different predefined distances with respect to a starting position. In modern means of locomotion, data regarding the route segment traveled by the means of locomotion are generally also available on the various bus systems of the means of locomotion. Those data can be made available to the parking assist system by way of a data input, so that the system is capable of ascertaining, upon a movement of the means of locomotion, the route segment that it has traveled beginning from a starting position. The parking assist system can thus acquire the first image, for example, at a distance of 1 m from the starting position, and the second image at a distance of 2 m from the starting position. Further images can in turn possibly be acquired, each at a distance a meter farther away from the starting position. It is also conceivable in this context to permit varying distances between the individual imaging events, for instance if the means of locomotion travels around a curve during the training run. It can be useful here to shorten the distance between the imaging events, since traveling around a curve causes a rapid horizontal change in environmental information with the result that if the spacing between the individual imaging events is too large, important environmental information cannot be detected. The distance to be selected between the individual images is preferably between 50 cm and 2 m.

In a further example embodiment according to the present invention, alternatively or in addition to the above-described predefined distances from the starting position, the imaging events are carried out at predefined points in time. Acquisition of the first image can thus occur, for example, 1 s after the training run begins, and acquisition of the second one after a further second has elapsed. This is advantageous in particular if no, or only very inaccurate, information about the route segment traveled is available to the parking assist system.

In a further advantageous embodiment, the time intervals between the individual imaging events can be shortened to the point that continuous imaging is carried out during the training run. This is implemented preferably by using a video camera that is configured to acquire images of the environment at time intervals of $\frac{1}{24}$ s or $\frac{1}{25}$ s. Generation of a continuous acquired image during the training run offers the advantage that almost uninterrupted environmental information, from the starting position to the destination position, is available for evaluation. A sufficiently large volatile memory, in which the acquired video image can be buffered, can be provided for this. Once the training run is complete it is possible, for example, to ascertain from the video data those individual images which optimally or unequivocally represent the movement path of the means of locomotion. When images are acquired in accordance with predefined distances and/or at predefined points in time, it can happen that some useful environmental information for an automatic parking operation in the execution phase is not detected. In contrast thereto, video imaging allows subsequent optimal selection of individual images that can then be subjected to the above-described method for feature extraction. The quality of the environmental information can thereby be optimized and, as a result thereof, the automatic parking operation can be carried out more reliably. In addition to enhancing the reliability of the environmental information, this method can also result in greater data reduction due to the fact that not only the quality of the environmental information, but also its suitability in terms of the method according to the present invention for data reduction, is taken into account when selecting the individual images from the acquired video image.

Instead of evaluating the acquired video image after the fact, evaluation of the acquired video image can also occur continuously. This procedure has the advantage that a large volatile memory is not required. For acquisition of the second image, candidate images are repeatedly acquired at short time intervals, e.g., $\frac{1}{25}$ s, and are each immediately evaluated. Depending on the evaluation, a decision is made as to whether the current image is used as a second image. If that is not the case, the image is immediately discarded (i.e., no longer occupies memory), and the subsequently acquired image is employed for another evaluation. The evaluation checks whether a significant difference exists between the candidate and the first image. If so, the candidate can be selected as a second image. A "significant difference" exists, for instance, if the image content has correspondingly changed as a result of a movement of the means of locomotion equivalent to, for example, one meter. This can be done using image sequence analysis means that are known to one skilled in the art, e.g., by ascertaining the optical flow.

According to a second aspect of the present invention, a method for data reduction of feature-based environmental information of a driver assistance system is performed in an execution phase. The method provides for acquiring an image of an environment of a means of locomotion using an optical sensor of the means of locomotion. The optical sensor can be, for example, a camera of a parking assist system which is disposed at a suitable point on the means of locomotion so that the requisite environmental information can be optimally detected.

At the beginning of the method the means of locomotion is in a starting position that very largely matches the starting position of the means of locomotion in the above-described training phase for a parking assist system. Because the starting position for the means of locomotion is respectively activated manually in the training phase and in the execution phase, a predefined tolerance range, in which the means of locomotion must be located for execution of an automatic parking operation, is defined for the starting position. In the next method step, as in the training phase, the image information is converted into a feature space by the fact that predefined features for each image point of the original image are extracted and are in turn stored in the form of feature vectors in a feature matrix. In the next method step the feature vectors are subjected to a filtering operation by the fact that all feature vectors that do not correspond to a predefined evaluation criterion are tagged in the feature matrix as invalid.

In the next method step the remaining, valid, feature vectors of the feature matrix are reconciled with feature matrices that were created in the course of the training phase and describe the environment. With the use of suitable distance dimensions or similarity dimensions, it is thereby possible to ascertain a best possible match with one of the feature matrices stored in the memory. The ascertained match with one of the stored feature matrices allows the current position of the means of locomotion to be ascertained. That in turn allows automatic control, based on the ascertained position data, of the means of locomotion on its path from the predefined starting position to a destination position specified in the training phase.

According to a third aspect of the invention, an apparatus includes a data input, an evaluation unit including processing circuitry, and a data output. The evaluation unit is configured to acquire, in conjunction with the data input, images of an environment of a means of locomotion using an optical sensor. The optical sensor can be, for example, a camera. The evaluation unit is furthermore configured to extract features from the acquired images, and to evaluate them in terms of their relevance to the above-described parking assist system, using an image analysis method. The evaluation unit is furthermore configured to ascertain, in the training phase of the parking assist system, similarities between those features of two images which are tagged as relevant, and to store them, in the form of data representing the similarities, in a memory unit connected to the evaluation unit. The evaluation unit is furthermore configured to ascertain, in the execution phase of the parking assist system, similarities between those relevant features of one of the detected images and the relevant features, stored in a memory unit, of images previously acquired in the training phase.

The evaluation unit is furthermore configured to store the ascertained features in the training phase in a memory unit via a data output, and to signal the ascertained similarities of features in the execution phase, via a data output, to a vehicle controller that executes the automatic parking operation.

Exemplifying embodiments of the invention are described below in detail with reference to the accompanying drawings.

BRIEF DESCRIPTION OF THE DRAWINGS

FIG. 1 is a flowchart illustrating steps of a method in a training phase according to an example embodiment of the present invention.

FIG. 2 is a flowchart illustrating steps of a method in an execution phase according to an example embodiment of the present invention.

DETAILED DESCRIPTION

Figure 3:
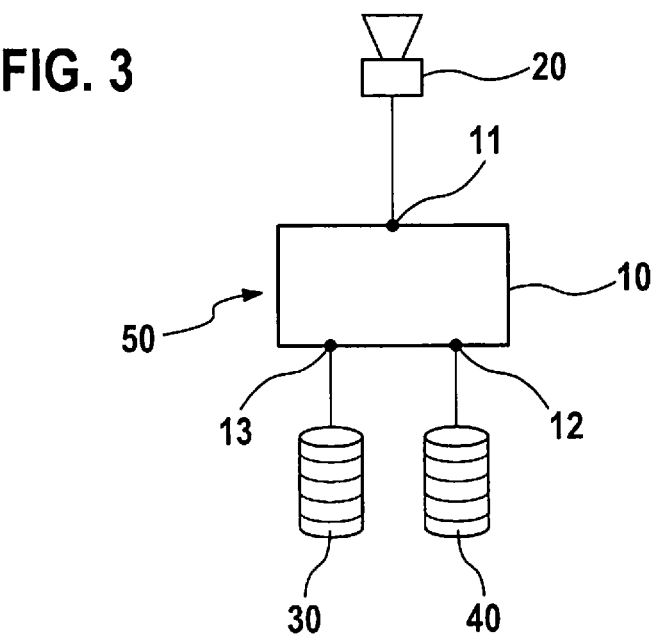
FIG. 3 is a schematic overview of components of an apparatus according to an example embodiment of the present invention.

FIG. 1 is a flowchart illustrating steps of an exemplifying embodiment of a method according to the present invention in a training phase 60. In step 100, a first image of an environment of a means of locomotion 70 is acquired from a first position 81 using an optical sensor 20. In step 200, a second image of the environment of means of locomotion 70 is acquired from a second position 82, differing from first position 81, using optical sensor 20. In step 300, features that represent the first image are extracted using an evaluation unit 10. Features that represent the second image are also extracted. The extracted features are stored, in the form of a feature matrix for the first image and a feature matrix for the second image, in a volatile memory 30 that is connected to evaluation unit 10. In step 400, individual regions of the first and the second image are rated on the basis of their contrast information, using evaluation unit 10. Low-contrast regions are marked in the respective feature matrix in volatile memory 30 as invalid, since as a rule they contain no information relevant to the parking assist system. In step 500, the previously rated feature matrices of the first and the second image are investigated in terms of similarities between the two matrices by way of a feature comparison. Regions that exhibit no significant similarity are marked in a resulting feature matrix as invalid. Regions having relevant matches are carried over unchanged into the resulting feature matrix. The resulting feature matrix is also stored, in the course of its creation, in volatile memory 30. Once the resulting feature matrix has been completely ascertained, it is stored in a nonvolatile memory 40.

FIG. 2 is a flowchart illustrating steps of an exemplifying embodiment of a method according to the present invention in an execution phase. In first step 100, an image of an environment of a means of locomotion 70 is acquired from a first position 81 using an optical sensor 20. In step 600, features that represent the image are extracted using an evaluation unit 10. The extracted features are stored in the form of a feature matrix in a volatile memory 30 that is connected to evaluation unit 10. In step 700, individual regions of the image are rated on the basis of their contrast information, using evaluation unit 10. Low-contrast regions are marked in the feature matrix in volatile memory 30 as invalid, since as a rule they contain no information relevant to the parking assist system. In step 800, the rated features of the image are reconciled with references that represent a plurality of images, in the form of selected features, acquired in a training phase 60.

FIG. 3 is a schematic overview of components of an apparatus 50 according to the present invention, encompassing an evaluation unit 10, a data input 11, and a data output 12. The evaluation unit encompasses a processor for ascertaining and rating feature data that are extracted from the signals of a camera 20 connected to data input 11 of evaluation unit 10. The apparatus according to the present invention furthermore includes a (preferably internal) volatile memory 30 and a nonvolatile memory 40 which are connected to evaluation unit 10 via data outputs 12 and 13.

Figure 4:
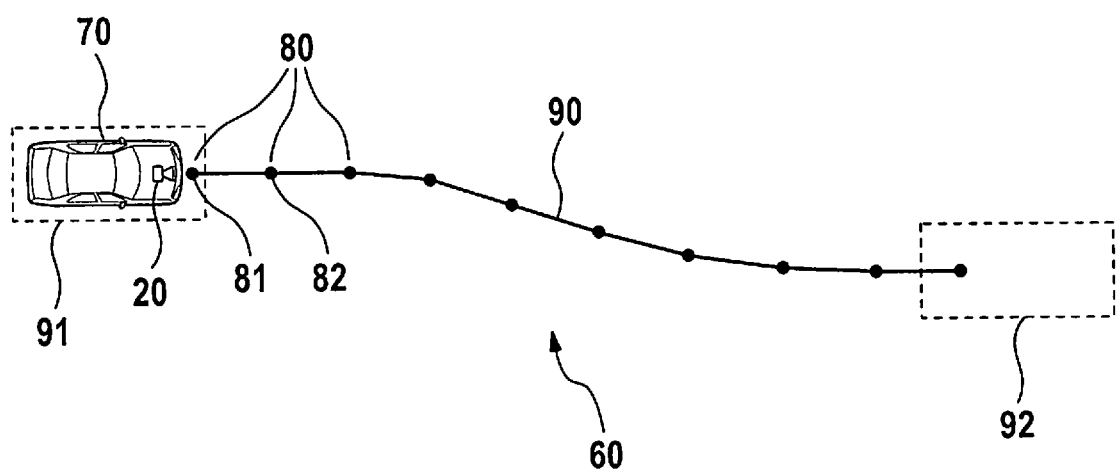
FIG. 4 shows an example of a training run for a Home Zone parking assist system of a means of locomotion according to an example embodiment of the present invention.

FIG. 4 shows an example of a training run 60 for a Home Zone parking assist system of a means of locomotion 70. The Home Zone training run encompasses slowing or halting means of locomotion 70 in a Home Zone starting position 91 to be selected by the user. Home Zone training run 60 is started by way of a subsequent user action. The user steers means of locomotion 70 along a suitable movement path 90 to a Home Zone destination position 92 to be selected by the user. Using optical sensor 20 disposed on means of locomotion 70, images of the environment of means of locomotion 70 are then acquired at predefined positions 80 and are processed by the evaluation unit of the parking assist system, for example in accordance with the method disclosed in conjunction with FIG. 1.

What is claimed is:
1. A method for data reduction of feature-based environmental information of a driver assistance system in a training phase, the method comprising:
using an optical sensor at a first position of a vehicle to acquire a first image of a first environment of the vehicle;

using the optical sensor at a second position of the vehicle to acquire a second image of a second environment of the vehicle;
executing a feature extraction algorithm to ascertain features that represent the first image and features that represent the second image;
tagging those of the ascertained features of the first and the second image that do not meet a predefined rating criterion;
subsequent to the tagging, comparing those of the ascertained features that were not tagged in the tagging step to identify those of the ascertained features that were not tagged in the tagging step that are similar to each other; and
generating a data structure in which the identified features are stored in a manner that is based on the identification,
wherein the generating the data structure includes performing a lossless compression of data representing the identified features.

2. The method of claim 1, wherein the acquiring of the first and second positions are performed responsive to the vehicle reaching respective predefined distances from a starting position.

3. The method of claim 2, wherein the predefined distances are defined such that a distance between the first and second positions is in a range of 50 cm to 2 m.

4. The method of claim 2, wherein the starting position is characterized by a predefined physical relationship to a defined home zone.

5. The method of claim 1, wherein the acquiring of the first and second positions are performed responsive to lapse of respective predefined periods of time beginning from a starting point in time.

6. The method of claim 1, wherein the optical sensor is a camera.

7. The method of claim 1, wherein the acquiring of the first and second image includes continuously:
performing an image detection for generation of video images using the optical sensor;
performing an evaluation of the generated video images;
deciding whether a most recently generated one of the video images is to be used as one of the first and second images.

8. A method for data reduction of feature-based environmental information of a driver assistance system in a training phase, the method comprising:
using an optical sensor at a first position of a vehicle to acquire a first image of a first environment of the vehicle;
using the optical sensor at a second position of the vehicle to acquire a second image of a second environment of the vehicle;
executing a feature extraction algorithm to ascertain features that represent the first image and features that represent the second image;
tagging those of the ascertained features of the first and the second image that do not meet a predefined rating criterion;
subsequent to the tagging, comparing those of the ascertained features that were not tagged in the tagging step to identify those of the ascertained features that were not tagged in the tagging step that are similar to each other; and
generating a data structure in which the identified features are stored in a manner that is based on the identification,
wherein the generating the data structure includes performing a lossless compression of data representing the identified features, the performing of the lossless compression including performing one or both of a run-length encoding and an entropy coding.

9. A method for data reduction of feature-based environmental information of a driver assistance system in an execution phase, the method comprising:
using an optical sensor to acquire an image of an environment of a vehicle;
executing a feature extraction algorithm to ascertain features that represent the image;
tagging those of the ascertained features of the image that do not meet a predefined rating criterion;
subsequent to the tagging, reconciling those of the ascertained features that were not tagged in the tagging step with feature references that represent a plurality of images acquired in a training phase; and
generating a data structure in which the reconciled features are stored in a manner that is based on the reconciliation,
wherein the generating the data structure includes performing a lossless compression of data representing the identified features.

10. An apparatus for data reduction of feature-based environmental information, the apparatus comprising:
a data input;
a data output; and
a processor, wherein the processor is configured to:
acquire, via the data input, images that include (1) a first image (a) obtained using an optical sensor at a first position of a vehicle and (b) that is of a first environment of the vehicle at the first position, and (2) a second image (a) obtained using the optical sensor at a second position of the vehicle and (b) that is of a second environment of the vehicle at the second position;
ascertain features extracted from the acquired images;
rate a relevance of the ascertained features;
tag those of the rated ascertained features whose rating does not satisfy a predefined criterion;
subsequent to the tagging, comparing those of the ascertained features that were not tagged in the tagging step to at least one of (a) each other and (b) features stored in the memory that are of images previously acquired during a training phase to identify those of the compared features that are similar to each other; and
via the data output, at least one of:
store data corresponding to the identification of the similar features; and
forward the data corresponding to the identification of the similar features to a control function of the driver assistance system.

* * * * *